United States Patent
Brannstrom et al.

(10) Patent No.: US 8,090,060 B2
(45) Date of Patent: Jan. 3, 2012

(54) DEMODULATION TECHNIQUE FOR GFSK AND DPSK

(75) Inventors: Fredrik Brannstrom, Mountain View, CA (US); Andrea Goldsmith, Menlo Park, CA (US); Farrokh Farrokhi, San Ramon, CA (US); Behrooz Rezvani, San Ramon, CA (US)

(73) Assignee: Quantenna Communications, Inc., Sunnyvale, CA (US)

( * ) Notice: Subject to any disclaimer, the term of this patent is extended or adjusted under 35 U.S.C. 154(b) by 1006 days.

(21) Appl. No.: 11/800,357

(22) Filed: May 4, 2007

(65) Prior Publication Data
US 2007/0268980 A1 Nov. 22, 2007

Related U.S. Application Data

(60) Provisional application No. 60/797,956, filed on May 4, 2006, provisional application No. 60/810,036, filed on May 31, 2006.

(51) Int. Cl.
*H04L 27/06* (2006.01)
*H04L 27/38* (2006.01)
*H04L 27/14* (2006.01)
*H03M 13/03* (2006.01)

(52) U.S. Cl. ......... 375/341; 375/330; 375/336; 714/792

(58) Field of Classification Search ............... 375/261, 375/262, 265, 269, 272–273, 279, 283, 303, 375/308, 323, 329, 334, 340, E1.028, 274, 375/330, 336, 341; 714/786, 792, 794, 795, 714/E11.057; 329/300, 304
See application file for complete search history.

(56) References Cited

U.S. PATENT DOCUMENTS

| | | | |
|---|---|---|---|
| 5,268,695 A | 12/1993 | Dentinger et al. | |
| 5,729,558 A * | 3/1998 | Mobin | 714/795 |
| 6,035,007 A | 3/2000 | Khayrallah et al. | |
| 6,081,700 A | 6/2000 | Salvi et al. | |
| 6,351,499 B1 | 2/2002 | Paulraj et al. | |
| 6,470,047 B1 | 10/2002 | Kleinerman et al. | |
| 6,477,208 B1 * | 11/2002 | Huff | 375/265 |
| 6,477,213 B1 | 11/2002 | Miyoshi et al. | |
| 6,484,285 B1 | 11/2002 | Dent | |

(Continued)

FOREIGN PATENT DOCUMENTS
WO  WO-2007021159  2/2007
(Continued)

OTHER PUBLICATIONS

Giallorenzi et al., Noncoherent Sequence Demodulation for Trellis Coded M-DPSK, 1991, Military Communicatios Conference, 1991. MILCON '91, Conference Record, 'Military Communications in a Changing World'., IEEE, vol. 3, pp. 1023-1027.*

(Continued)

*Primary Examiner* — Tesfaldet Bocure
*Assistant Examiner* — Lawrence Williams (57) ABSTRACT

A technique for low-complexity high-performance coherent demodulation of GFSK signals involves utilizing a novel phase and frequency tracking mechanism coupled with a trellis search technique to track signal memory in the demodulation process. A method according to the technique may include modeling modulation based upon a trellis. The method may further include estimating unknown parameters, selecting a maximum likelihood path through the trellis, and mapping the maximum likelihood path to an output bit sequence. The technique is also applicable to DSPK and other applicable known or convenient protocols.

18 Claims, 9 Drawing Sheets

U.S. PATENT DOCUMENTS

| | | | |
|---|---|---|---|
| 6,642,904 | B2 | 11/2003 | Yokoshima et al. |
| 6,807,404 | B2 | 10/2004 | Meijer |
| 6,871,052 | B2 | 3/2005 | Spencer et al. |
| 6,967,598 | B2 | 11/2005 | Mills |
| 7,035,343 | B2 * | 4/2006 | Chi et al. ............... 375/265 |
| 7,058,422 | B2 * | 6/2006 | Learned et al. ........... 455/526 |
| 7,076,263 | B2 | 7/2006 | Medvedev et al. |
| 7,194,237 | B2 | 3/2007 | Sugar et al. |
| 7,224,743 | B2 | 5/2007 | Holmes et al. |
| 7,298,798 | B1 * | 11/2007 | Chao et al. ............... 375/341 |
| 7,321,636 | B2 | 1/2008 | Harel et al. |
| 7,400,872 | B2 | 7/2008 | Kogure |
| 7,415,079 | B2 | 8/2008 | Cameron et al. |
| 7,450,657 | B2 | 11/2008 | Paulraj et al. |
| 7,533,327 | B2 | 5/2009 | Heiman et al. |
| 7,564,931 | B2 * | 7/2009 | Venkataramani et al. .... 375/341 |
| 7,623,836 | B1 | 11/2009 | Finkelstein |
| 2002/0163879 | A1 | 11/2002 | Li et al. |
| 2003/0003863 | A1 | 1/2003 | Thielecke et al. |
| 2003/0081701 | A1 | 5/2003 | Pick et al. |
| 2003/0087673 | A1 | 5/2003 | Walton et al. |
| 2003/0141938 | A1 * | 7/2003 | Poklemba et al. ............ 332/103 |
| 2003/0157954 | A1 | 8/2003 | Medvedev et al. |
| 2003/0185309 | A1 | 10/2003 | Pautler et al. |
| 2004/0013209 | A1 * | 1/2004 | Zehavi et al. ............... 375/334 |
| 2004/0153679 | A1 | 8/2004 | Fitton et al. |
| 2004/0234012 | A1 | 11/2004 | Rooyen |
| 2004/0240486 | A1 | 12/2004 | Venkatesh et al. |
| 2005/0053172 | A1 | 3/2005 | Heikkila |
| 2005/0085269 | A1 | 4/2005 | Buljore et al. |
| 2005/0099937 | A1 | 5/2005 | Oh et al. |
| 2005/0113041 | A1 | 5/2005 | Polley et al. |
| 2005/0130694 | A1 | 6/2005 | Medvedev et al. |
| 2005/0170839 | A1 | 8/2005 | Rinne et al. |
| 2005/0192019 | A1 | 9/2005 | Kim et al. |
| 2005/0195784 | A1 | 9/2005 | Freedman et al. |
| 2005/0220057 | A1 | 10/2005 | Monsen |
| 2005/0245201 | A1 | 11/2005 | Ella et al. |
| 2005/0265470 | A1 | 12/2005 | Kishigami et al. |
| 2005/0276361 | A1 | 12/2005 | Kim et al. |
| 2006/0034217 | A1 | 2/2006 | Kwon et al. |
| 2006/0034221 | A1 | 2/2006 | Karaoguz et al. |
| 2006/0083290 | A1 * | 4/2006 | Shin et al. ............... 375/131 |
| 2006/0094385 | A1 | 5/2006 | Rafati |
| 2006/0223487 | A1 | 10/2006 | Alam et al. |
| 2006/0270427 | A1 | 11/2006 | Shida et al. |
| 2006/0276227 | A1 | 12/2006 | Dravida |
| 2007/0136446 | A1 | 6/2007 | Rezvani et al. |
| 2007/0153924 | A1 | 7/2007 | Ling et al. |
| 2007/0202818 | A1 | 8/2007 | Okamoto |
| 2007/0230638 | A1 | 10/2007 | Griniasty |
| 2007/0258534 | A1 * | 11/2007 | Schmidt ............... 375/262 |
| 2008/0139123 | A1 | 6/2008 | Lee et al. |
| 2008/0159123 | A1 | 7/2008 | Tehrani et al. |
| 2010/0091891 | A1 | 4/2010 | Calando et al. |

FOREIGN PATENT DOCUMENTS

| | | |
|---|---|---|
| WO | WO-2007130578 | 11/2007 |

OTHER PUBLICATIONS

Hong et al., Detection of Amplitude-Phase Modulated Signals Over Frequency Nonselective Rayleigh Fading Channels With Adaptive Symbol-Aided Channel Estimation, 1996, Vehicular Technology Conference, 1996. 'Mobile Technology for the Human Race'., IEEE 46th, vol. 2, pp. 983-987.*
International Search Report, PCT/US07/10845, (Jul. 28, 2008).
Ratfai et al., *IEEE Custom Integrated Circuit Conference*, P-41-1:357-361 (2005).
Ratfai et al., *IEEE Journal of Solid State Circuits*, 42(6):1291-1299 (2007).
Ratfai et al., IEEE Custom Integrated Circuit Conference, pp. 41-1:357-361 (2005).
Ratfai et al., IEEE Journal of Solid State Circuits, 42(6):1291-1299 (2007).
International Search Report of PCT/US07/10845 dated Jul. 28, 2008, pp. 1-3.
Written Opinion of PCT/US07/10845 dated Jul. 28, 2008, pp. 1-7.
International Search Report of PCT/US2008/011965 dated Mar. 25, 2009, pp. 1-3.
Written Opinion of PCT/US2008/0119655 dated Mar. 25, 2009, pp. 1-6.
Co-pending U.S. Appl. No. 11/653,135, filed Jan. 11, 2007.
Final Office Action Mailed May 11, 2010 in Co-pending U.S. Appl. No. 11/653,135, filed Jan. 11, 2007.
Non-Final Office Action Mailed Dec. 31, 2009 in Co-pending U.S. Appl. No. 11/653,135,. filed Jan. 11, 2007.
Non-Final Office Action Mailed Jun. 8, 2009 in Co-pending U.S. Appl. No. 11/653,135, filed Jan. 11, 2007.
Co-pending U.S. Appl. No. 11/800,378, filed May 4, 2007.
Co-pending U.S. Appl. No. 12/299,470, filed Mar. 19, 2009.
Co-pending U.S. Appl. No. 11/872,700, filed Oct. 15, 2007.
Co-pending U.S. Appl. No. 12/288,569, filed Oct. 20, 2008.
Non-Final Office Action Mailed Aug. 5, 2010, in co-pending U.S. Appl. No. 11/872,700, filed Oct. 15, 2007.
Giallorenzi et al., "Noncoherent Sequence Demodulation for Trellis Coded M-DPSK", Military Communications Conference, 1991, MILCOM '91, Conference Record, Military Communication in a Changing World, IEEE, vol. 3, Nov. 1991, pp. 1023-1027.
Hong et al., "Detection of Amplitude-Phase Modulated Signals Over Frequency Nonselective Rayleigh Fading Channels with Adaptive Symbol-Aided Channel Estimation", 1996, Vehicular Technology Conference, 1996, Mobile Technology for the Human Race, IEEE 46th, vol. 2, pp. 983-987.
Office Action mailed May 4, 2011 from U.S. Appl. No. 11/653,135 filed Jan. 11, 2007.
Office Action mailed Dec. 7, 2010 from U.S. Appl. No. 11/800,378 filed May 4, 2007.
Notice of Allowance mailed Mar. 17, 2011 from U.S. Appl. No. 11/800,378 filed May 4, 2007.
Office Action mailed Jan. 26, 2011 from U.S. Appl. No. 12/299,470 filed Mar. 19, 2009.
Office Action mailed Feb. 15, 2011 from U.S. Appl. No. 11/872,700 filed Oct. 15, 2007.
Notice of Allowance mailed May 23, 2011 from U.S. Appl. No. 11/872,700 filed Oct. 15, 2007.

* cited by examiner

DEMODULATION TECHNIQUE FOR GFSK AND DPSK

CROSS-REFERENCE TO RELATED APPLICATIONS

This application claims priority to U.S. Provisional Application 60/797,956, entitled Multimedia Cell Platform, filed May 4, 2006, and to U.S. Provisional Application 60/810,036, entitled Time Multiplexing Antenna Diversity System, filed May 31, 2006, both of which are incorporated herein by reference.

BACKGROUND

Phase-shift keying (PSK) is a digital modulation scheme that conveys data by changing, or modulating, the phase of a reference signal (the carrier wave). Any digital modulation scheme uses a finite number of distinct signals to represent digital data. PSK uses a finite number of phases. The demodulator, which is designed specifically for the symbol-set used by the modulator, determines the phase of the received signal and maps it back to the symbol it represents, thus recovering the original data. This requires the receiver to be able to compare the phase of the received signal to a reference signal—such a system is termed coherent.

Alternatively, instead of using the bit patterns to set the phase of the wave, the bit patterns can instead be used to change the phase of the wave by a specified amount. The demodulator then determines the changes in the phase of the received signal rather than the phase itself. Since this scheme depends on the difference between successive phases, it is termed differential phase-shift keying (DPSK). DPSK can be significantly simpler to implement than ordinary PSK since there is no need for the demodulator to estimate the reference signal to determine the exact phase of the received signal (it is a non-coherent scheme). In exchange, it sometimes produces more erroneous demodulations. The exact requirements of the particular scenario under consideration determine which scheme is used.

Gaussian Frequency Shift Keying (GFSK) is a type of Frequency Shift Keying modulation that utilizes a Gaussian filter to smooth positive/negative frequency deviations, which represent a binary 1 or 0. GFSK and DPSK are used in Bluetooth radios. GFSK is also used in the cordless Digital Enhanced Cordless Telecommunications (DECT) phone standard and the cellular Global System for Mobile Communications (GSM) standard, along with the GSM enhancements for High Speed Circuit Switched Data (HSCSD) and Enhanced Data Rates for GSM Evolution (EDGE). GFSK is also used by Cypress Wireless USB, Nordic Semiconductor, and z-wave devices.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

Gaussian frequency shift keying (GFSK) modulation is a modulation whereby the information bits are embedded in the frequency or phase of the transmitted signal, which makes the signal less susceptible to amplitude nonlinearities introduced by the channel and/or receiver hardware. GFSK is typically implemented as a form of frequency modulation (FM), in which case it is a modulation format with memory. GFSK is typically demodulated incoherently to reduce receiver complexity, but this can result in a 2-3 dB degradation in performance relative to a coherent demodulation where the phase and frequency of the signal is tracked. A technique for low-complexity high-performance coherent demodulation of GFSK signals involves utilizing a novel phase and frequency tracking mechanism coupled with a trellis search technique to track signal memory in the demodulation process.

A method according to the technique may include modeling modulation based upon a trellis. The method may further include estimating unknown parameters, selecting a maximum likelihood path through the trellis, and mapping the maximum likelihood path to an output bit sequence.

BRIEF DESCRIPTION OF THE DRAWINGS

Embodiments of the inventions are illustrated in the figures. However, the embodiments and figures are illustrative rather than limiting; they provide examples of the inventions.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

In GFSK, past bit transmissions are embedded in the signal phase associated with the current bit period T. Specifically, the transmitted signal at time t has constant amplitude and a phase equal to $\theta(t,a) = 2\pi f_c t + \phi(t,a)$, where $f_c$ is the carrier frequency and $\phi(t,a)$ is the information carrying phase given by $$\phi(t, a) = 2\pi h \sum_{i=0}^{L-1} a[i]q(t - iT)$$

for h the modulation index, $a[i] \in \{+1,-1\}$ the polar representation of the binary data bits, L the length of the signal memory, T the bit period, and q(t) the phase response. The memory in the information carrying phase is of length L−1, since at time t the phase depends on the current data bit as well as the previous L−1 data bits. The phase response is the integral of the frequency response g(t), i.e.

$$q(t) = \frac{1}{2}\int_{-\infty}^{t-T} g(\beta)d\beta,$$

where $g(t)=u(t)*h_g(t)$ is the convolution of a rectangular pulse u(t) and a Gaussian pulse $h_g(t)$.

If the signal is down converted using a frequency $$f_0 = f_c - \frac{h}{2T},$$

then the complex baseband received signal becomes $r(t)=s(t)e^{j\phi(t)}+n(t)=e^{j\psi(t,b)}e^{j\phi(t)}+n(t)$, where s(t) is the complex baseband transmitted signal, n(t) is the complex baseband noise of the received signal, $\psi(t,b)$ is the demodulated phase of the signal given by $$\psi(t, b) = \theta(t, b) - 2\pi f_0 = \phi(t, b) + \frac{\pi h}{T}t$$

for $b[i] = 0.5(a[i] + 1) \in \{0, 1\}$ the binary representation of the data, and $\phi(t)=\phi_0+2\pi\Delta_f t$ is the time-varying phase offset of the received signal, which depends on a fixed phase offset $\phi_0$ and a frequency offset $\Delta_f$, and is thus independent of the data.

The complex baseband transmitted signal can be written as $$s(t) = \sum_{i=0}^{L} \rho_{m_i}(t - iT),$$

where $$\rho_{m_i}(t) = \begin{cases} s(t + iT) = e^{j\psi(t+iT,b)} & 0 < t \le T \\ 0 & \text{otherwise} \end{cases}.$$

A technique for detecting transmitted data with low complexity involves estimating unknown parameters and then using them in a trellis search to estimate the transmitted data. The trellis may or may not be a reduced state trellis.

Figure 1:
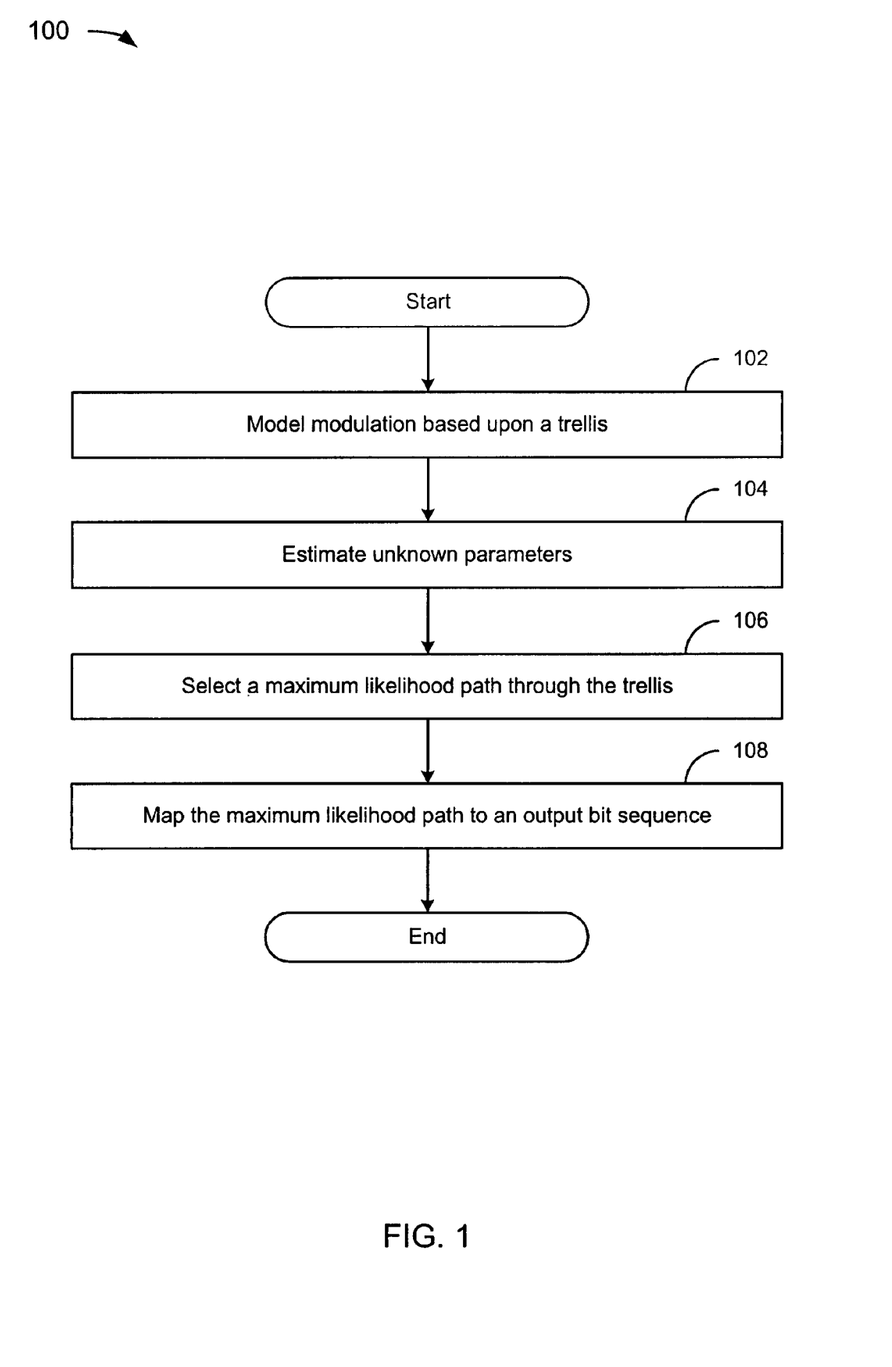
FIG. 1 depicts a flowchart of an example of a method for detecting transmitted data with low complexity.

FIG. 1 depicts a flowchart 100 of an example of a method for detecting transmitted data with low complexity. The method is organized as a sequence of modules in the flowchart 100. However, it should be understood that these and modules associated with other methods described herein may be reordered for parallel execution or into different sequences of modules. In the example of FIG. 1, the flowchart 100 starts at module 102 with modeling modulation based upon a trellis. The modeling may or may not be accomplished in real time.

For example, the modeling may take place beforehand, and the remaining modules (104-108) of the flowchart 100 may take place in real-time or near-real-time.

In the example of FIG. 1, the flowchart 100 continues to module 104 where unknown parameters are estimated. In an illustrative embodiment, it is assumed that both the phase offset $\phi_0$ and/or the frequency offset $\Delta_f$ in the received signal are unknown. Let $\hat{\phi}_0$ and $\hat{\Delta}_f$ denote the estimates for the phase offset $\phi_0$ and frequency offset $\Delta_f$, respectively. These estimates may be obtained from estimation algorithms applied to training sequences or preambles in the data prior to demodulation, data-driven estimation as described later with reference to FIGS. 3, 4A, 4B, 7A, and 7B, or using other applicable known or convenient estimation techniques.

A modulation index may or may not need to be approximated. For example, the modulation index could be either explicit, approximated, or obviated. In an illustrative embodiment, a state trellis search is based on some approximations that allow a simple characterization, and hence detection, of the transmitted signal. For example, where k and p are relative primes a modulation index h=k/p can be approximated. Advantageously, as described later, restricting the modulation index to these values allows coherent maximum-likelihood demodulation through a recursive updating of just a few parameters. As an example of a way to simplify the expression for the signal phase, q(2T)=0.5 can also be approximated. With these approximations $\rho_{m_i}(\tau)$ corresponds to exactly 2p possible signals and we can write the phase over a given bit time in terms of the current and past bits as $$\psi(\tau + (n-1)T, b) = 2\pi h(d[n-2] + \omega(\tau, b[n-1], b[n])),$$

where $$d[n-2] = R_p\left[\sum_{i=0}^{n-2} b[i]\right] \in \{0, 1, \ldots, p-1\},$$

for $R_p[c]$ the modulo p operator and $$\omega(\tau, b[n-1], b[n]) = 2b[n-1]q(\tau + T) + 2b[n]q(\tau) + \frac{\tau}{2T} - q(\tau + T) - q(\tau) + \frac{1}{2}.$$

Figure 2:
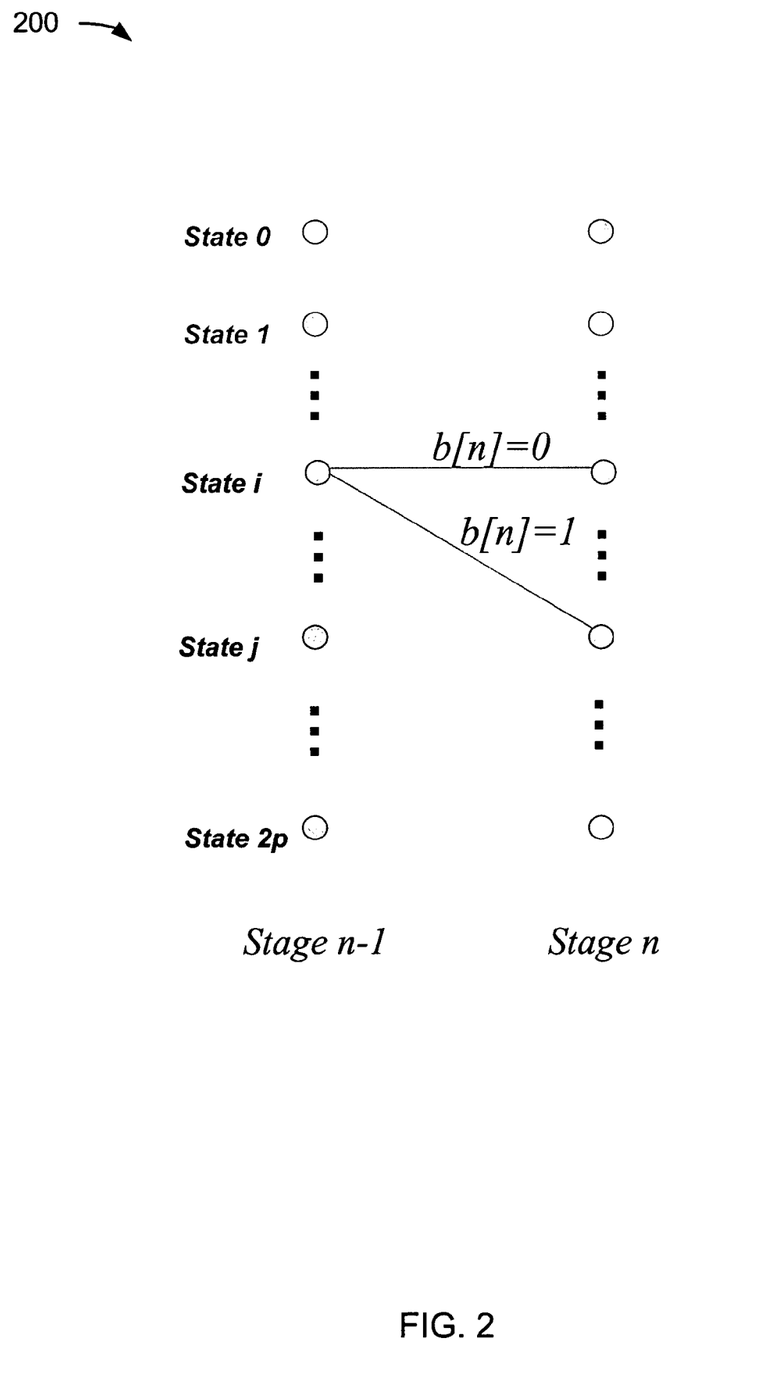
FIG. 2 depicts an example of a trellis diagram for GFSK with 2p states.

In the example of FIG. 1, the flowchart 100 continues to module 106 where a maximum-likelihood path through a trellis is selected. Note that there are only four different values for $\omega(\tau,b[n-1],b[n])$ and also that the phase is slightly different over the first bit time and the last bit time due to the lack of a previous bit for the first bit time and the lack of a subsequent bit for the last bit time. The phase of a received signal over any bit period $(n-1)T \le t < nT$ depends only on d[n−2], b[n−1], and b[n], i.e. on the current and immediately previous data bit values (when present) as well d[n−2], which captures the n−2 bit values prior to b[n−1]. Since d[n−2] has p possible values and b[n−1] has two possible values, we can simplify detection by modeling the transmitted bit sequence as a path through a trellis with 2p states (corresponding to the possible joint values of d[n−2] and b[n−1]) at the nth trellis stage. Since the trellis state corresponds to the values of d[n−2] and b[n−1], it captures all the memory of past bit transmissions in the current bit transmission b[n]. The transition from the trellis state at the (n−1)th stage to the nth stage is determined by whether b[n] is a 0 or 1 bit, as depicted in FIG. 2. Thus, given a path through the trellis that is selected as the maximum-likelihood path based on the received signal, the maximum-likelihood bit decision $\tilde{b}[n]$ is determined by the transition from Stage n−1 to Stage n.

In the example of FIG. 1, the flowchart 100 continues to module 108 where the maximum likelihood path is mapped to an output bit sequence. Having provided low complexity detection of transmitted data, the flowchart 100 ends.

FIG. 2 depicts an example of a trellis diagram 200 for GFSK with 2p states. The number of states (i.e., 2p) is based upon d[n−2] and b[n−1], as described previously.

Figure 3:
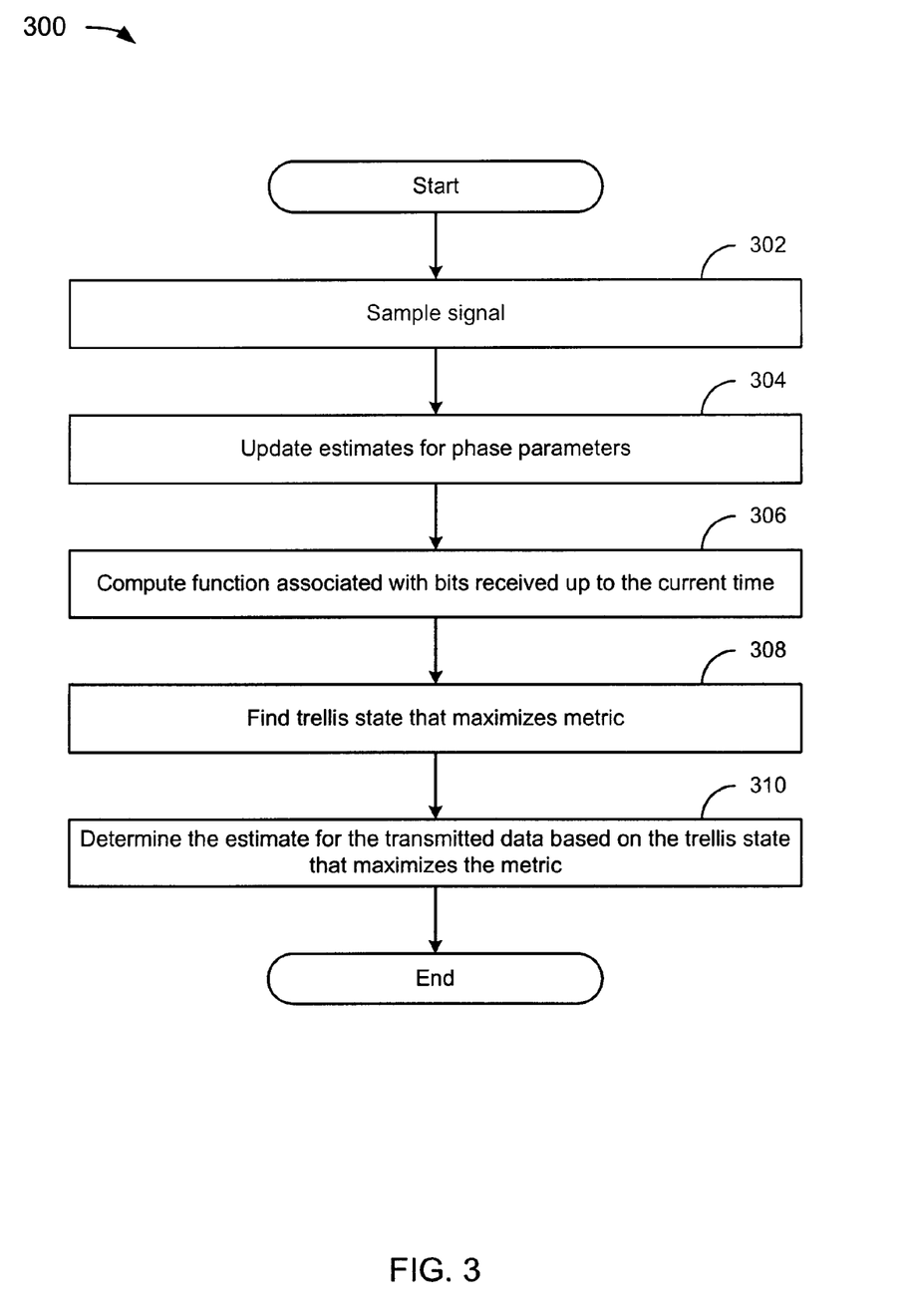
FIG. 3 depicts a flowchart of an example of a demodulation process based on phase/frequency tracking and a trellis search.

FIG. 3 depicts a flowchart 300 of an example of a demodulation process based on phase/frequency tracking and a trellis search. In the example of FIG. 3, the flowchart 300 starts at module 302 with sampling a signal. In an illustrative embodiment, the received signal is sampled N times over a bit period, where N is a design parameter with a minimum value of 1 (1 sample per bit period). For the received signal over the ith bit period, these samples are averaged to obtain $$r[i] = \frac{1}{N}\sum_{k=0}^{N-1} r((i+k/N)T).$$

In the example of FIG. 3, the flowchart 300 continues to module 304 where estimates for phase parameters are updated. The phase parameters may include, by way of example but not limitation, phase and frequency offsets. The demodulation process for a sequence of L transmitted bits proceeds as follows. Over each bit time iT the received signal is used to compute r[i] and obtain estimates for the phase and frequency offsets, $\hat{\phi}_0[i]$ and $\hat{\Delta}_f[i]$, respectively. These estimates may be obtained, by way of example but not limitation, from a preamble prior to bit transmission, through maximum-likelihood or maximum a posteriori estimation, or through a recursive updating at each bit time based on prior estimates and the received signal over the ith bit period. The recursive update can be simplified by making it a function of r[i] instead of the entire received signal over the ith bit time.

In the example of FIG. 3, the flowchart 300 continues to module 306 where a function associated with bits received up to the current time is computed. A sampled average for $\rho[m_i(t)]$ over the ith bit period is given by $$\rho[m_i] = \frac{1}{N}\sum_{k=0}^{N-1} \rho((i+k/N)T).$$

Note that $\rho[m_i]$ can be rewritten as $$\rho[m_i] = e^{j2\pi h v_i[1]}\sum_{k=0}^{N} e^{j2\pi h \omega(kT/N, v_i[2], v_i[3])}$$

for $v_i=[v_i[1],v_i[2],v_i[3]]=[d[i-2],b[i-1],b[i]]$. Thus, we can express $\rho[m_i]$ in terms of the ith data bit and the state of the trellis shown in FIG. 2 at stage i.

In the example of FIG. 3, the flowchart 300 continues to module 308 where a trellis state that maximizes the metric is found. Assuming the time-varying phase offset φ(t) over bit time iT is accurately estimated by $\hat{\phi}(t)=\hat{\phi}_0[i]+2\pi\hat{\Delta}_f[i]t$, we approximate the maximum-likelihood (ML) detector for the L transmitted data bits by, at time i, choosing the $\tilde{m}_i$ (or, equivalently, the trellis path at time i) to maximize the metric $$\Lambda[L-1] = Re\left\{\sum_{i=0}^{L-1} r[i]\rho^*[\tilde{m}_i]e^{-j(\hat{\phi}_0[i]+2\pi\hat{\Delta}_f[i]iT)}\right\},$$

where $\rho^*[\tilde{m}_i]$ denotes the complex conjugate of $\rho[\tilde{m}_i]$.

It should be noted that, in an illustrative embodiment, metrics are computed at each stage, but the bit decisions can be made at each stage, or the decision can be delayed until all of the computations, at each stage, have been made. Waiting until the end to maximize the metric and output the corresponding bits introduces delay, but can result in a more optimal path, which tends to improve performance. Performing the maximization at each time i and outputting the bits associated with the trellis path with the maximum metric at time i, on the other hand, has the advantage of reduced delay and lower memory requirements.

In the example of FIG. 3, the flowchart 300 ends at module 310 where an estimate for the transmitted data based on the trellis state that maximizes the metric is determined. In an illustrative embodiment, $\tilde{m}_i$ is mapped for i=1, . . . , L to $\tilde{b}[0]$, . . . , $\tilde{b}[L-1]$. The detected data is thus a sequence $\tilde{b}[0]$, . . . , $\tilde{b}[L-1]$ that maximizes the maximum-likelihood metric $\Lambda[i]$ for each time i, or at time L−1 at the end of the sequence of bit transmissions.

Figure 4A:
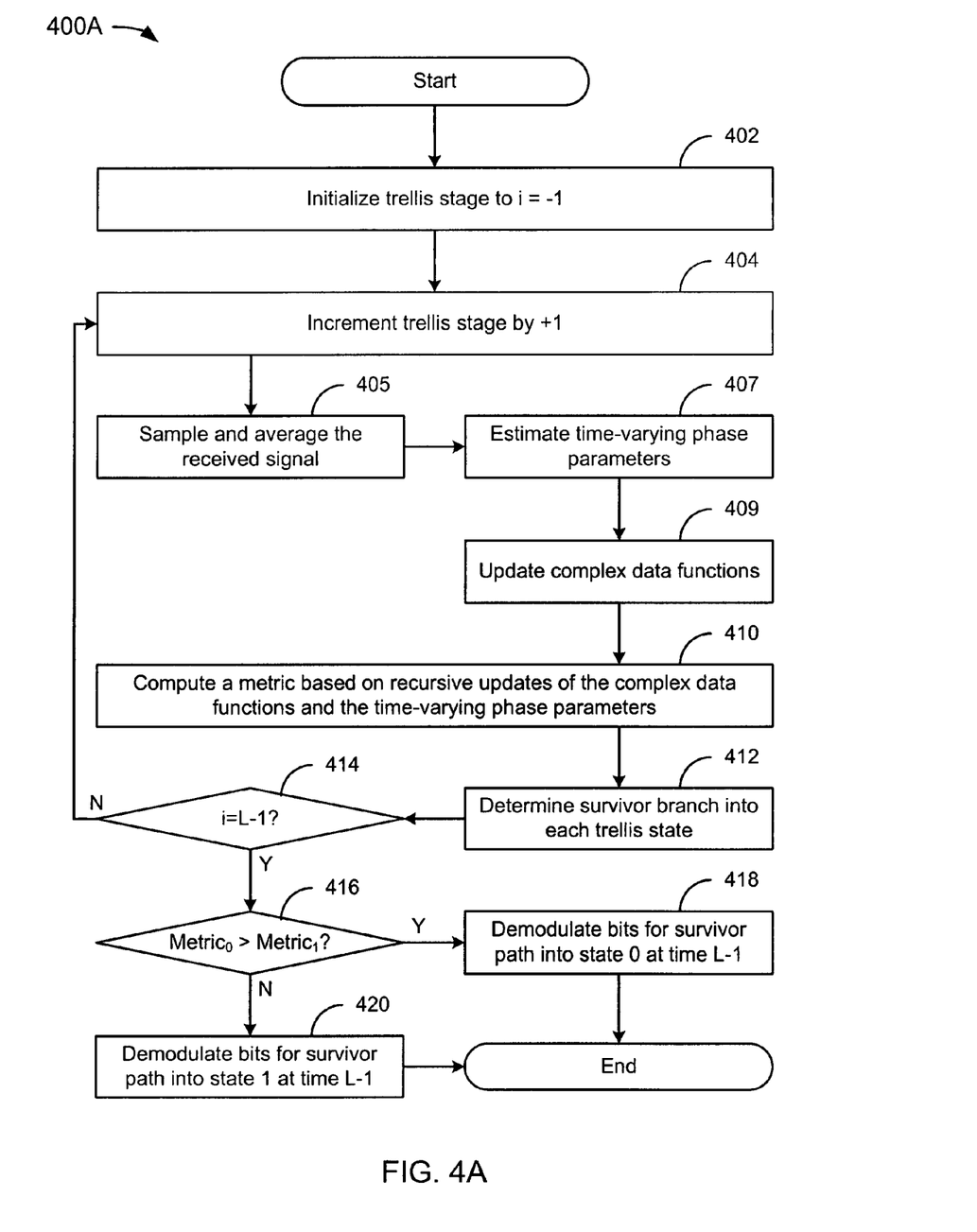
FIGS. 4A and 4B depict flowcharts of examples of methods for reducing ML detector complexity through per-survivor processing.
Figure 4B:
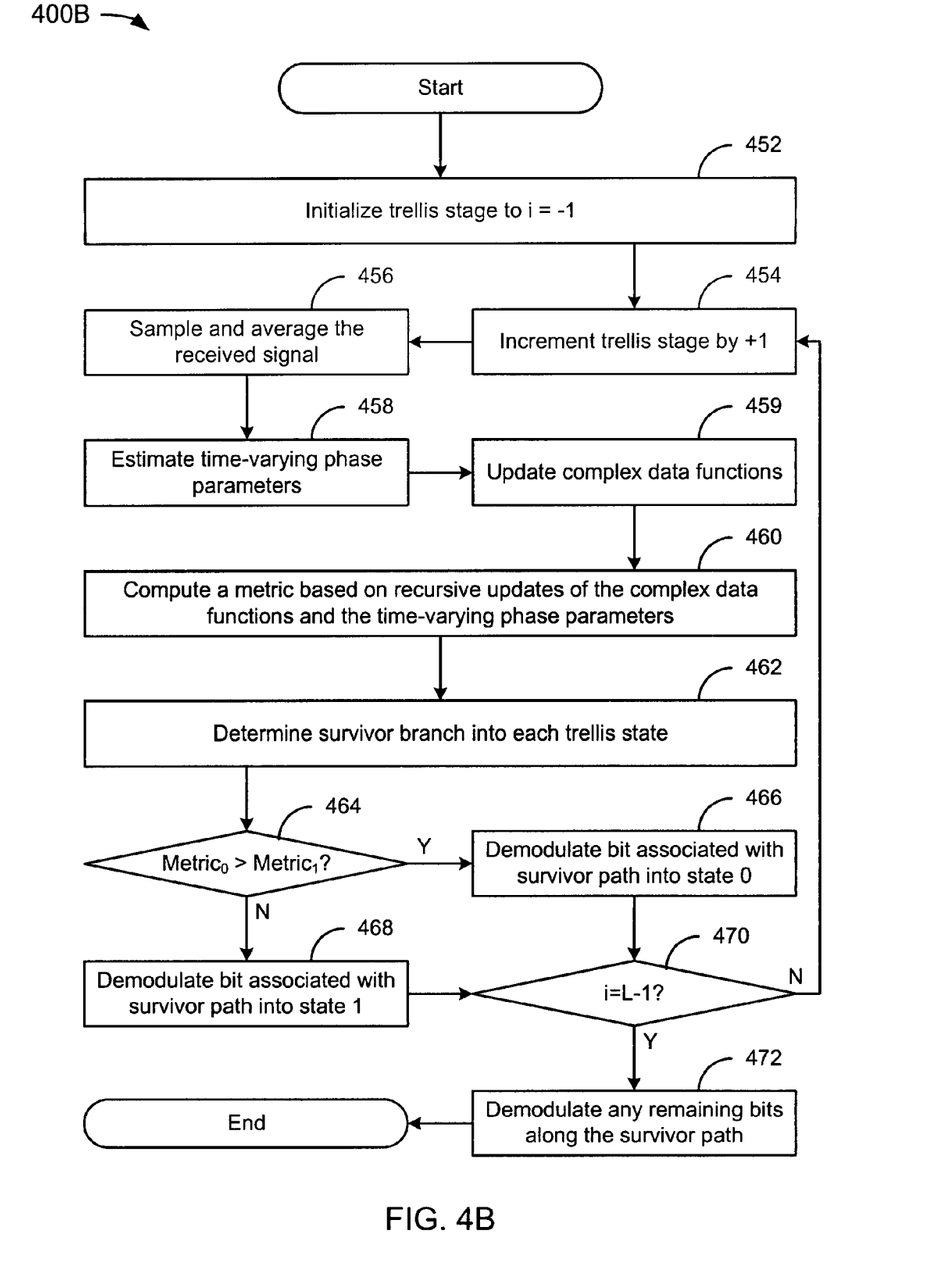

FIGS. 4A and 4B depict flowcharts of examples of methods for reducing ML detector complexity through per-survivor processing. The complexity and memory requirements of the ML detector corresponding to the metric, $\Lambda[L-1]$, can be substantially reduced through per-survivor processing. This reduces the number of states in the trellis of FIG. 2 from 2p to 2.

FIG. 4A is intended to show per-survivor processing where output is at the end of the process. In the example of FIG. 4A, the flowchart 400A starts at module 402 where a trellis stage is initialized to −1.

In the example of FIG. 4A, the flowchart 400A continues to module 404 where the trellis stage is incremented. Over the ith bit time we compute d[i−2] based on past bit decisions up until time i−2. If d[i−2] is fixed then the current bit decision only depends on this fixed value and the 2 possible values for the previous bit value b[i−1]. Hence the trellis to determine b[i] has just 2 states, which we will denote as states 0 and 1. For this trellis let $\mu_y[i]\in\{0,1\}$ denote the start state of the survivor path in trellis section i that ends in state $y\in\{0,1\}$.

In the example of FIG. 4A, the flowchart 400A continues to module 405 where the received signal is sampled and averaged. For the received signal over the Rh bit period, the samples are averaged to obtain $$r[i] = \frac{1}{N}\sum_{k=0}^{N-1} r((i+k/N)T).$$

In the example of FIG. 4A, the flowchart 400A continues to module 407 where time-varying phase parameters are estimated. The time-varying phase parameters may include, by way of example but not limitation, the phase offset and/or frequency offset. Thus, in an illustrative embodiment, over bit period iT the phase and frequency offsets $\hat{\phi}_0[i]$ and $\hat{\Delta}_f[i]$ are estimated. It may be noted that the time-varying phase parameters are not affected by data values, but rather by hardware variations, temperature, propagation environment, and/or other factors.

In the example of FIG. 4A, the flowchart 400A continues to module 409 where complex data functions are updated.

In the example of FIG. 4A, the flowchart 400A continues to module 410 where a metric is computed based on recursive updates of data functions and the time-varying phase parameters. The total metric for the branch ending in state y after trellis section i can then be updated recursively as $\Lambda_y[i]= \max_{x \in \{0,1\}} \Lambda_x[i-1] + \lambda_{x \to y}[i]$, where $\lambda_{x \to y}[i]$ is the branch metric for the branch going from state x to state y in trellis section i. This recursive update indicates that there will be only one surviving path into each state $y \in \{0,1\}$ of the trellis at stage i, which will correspond to the path between x and y for the x achieving the maximum $\Lambda_y[i]$. The branch metric $\lambda_{x \to y}[i]$ is given by $$\lambda_{x \to y}[i] = \text{Re}\{r[i]\rho^*[\tilde{m}_i]e^{-j(\hat{\phi}_0[i]+2\pi\hat{\Delta}_f[i]iT)}\}$$
$$= \text{Re}\{r[i]e^{-j2\pi h d_c[i-2]}z^*(x,y)e^{-j(\hat{\phi}_0[i]+2\pi\hat{\Delta}_f[i]iT)}\},$$

for $c=\mu_x[i-1]$ and $$z(v_i[2], v_i[3]) = \int_0^T e^{j2\pi h\omega(\tau, v_i[2], v_i[3])} d\tau.$$

Note that $d_{\mu_x[i-1]}[i-2] = R_p[d_x[i-1] - \mu_x[i-1]]$.

In the example of FIG. 4A, the flowchart 400A continues to module 412 where a survivor branch into each trellis state is determined. The calculation of the surviving branch entering each trellis state at stage i, i.e. the branch maximizing the metric $\Lambda_y[i]$, y=0,1 is based on values for r[i], $d_x[i-1], \mu_x[i-1]$, and $\Lambda_x[i-1]$, x=0,1. Once the surviving branch into each state $y \in \{0,1\}$ at stage i is determined, the starting state $\mu_y[i]$ is updated based on the start state of the surviving branch, and based on this value the parameter $d_y[i]$ is updated according to $d_x[i] = R_p[d_{\mu_x[i]}[i-1]+x]$.

In the example of FIG. 4A, the flowchart 400A continues to decision point 414 where it is determined whether i=L−1. If it is determined that i≠L−1 (414-N), then the flowchart 400A returns (recursively) to module 404 and continues as described previously. Thus, the process is repeated over each bit time until the final cumulative metric $\Lambda_{x[L-1]}$ corresponding to all L bit transmissions is obtained for x=0,1. When it is determined that i=L−1 (414-Y), the recursion ends.

In the example of FIG. 4A, the flowchart 400A continues to decision point 416 where it is determined whether a metric 0 (e.g., $\Lambda_0$) is greater than a metric 1 (e.g., $\Lambda_1$). If it is determined that the metric 0 is greater than the metric 1, then the flowchart 400A continues to module 418 where the L−1 bits for the survivor path into State 0 at time L−1 are demodulated. In other words, if $\Lambda_0[L-1] > \Lambda_1[L-1]$, the surviving path into State 0 at time L−1 is assumed to be the ML path. If, on the other hand, it is determined that the metric 0 is less than or equal to the metric 1, then the flowchart 400A continues to module 420 where the L−1 bits for the survivor path into State 0 at time L−1 are demodulated. In other words, the surviving path into State 1 at time L−1 is assumed to be the ML path. The bit sequence $\tilde{b}[0], \ldots, \tilde{b}[L-1]$ is demodulated based on the states x[i] along that ML path as $\tilde{b}[i] = x[i]$, i.e. at time i, the bit $\tilde{b}[i]$ corresponding to the survivor path into State 0 is $\mu_0[i+1]$ and the bit corresponding to the survivor path into State 1 is $\mu_1[i+1]$. The bit sequences up to time i−1 corresponding to the survivor paths at time i are updated at each time interval and the demodulated bit sequence then corresponds to the ML trellis path at time L−1. After the bits for the survivor path are demodulated, the flowchart 400A ends.

FIG. 4B illustrates per-survivor processing with output at each stage of the trellis. This reduces memory requirements and delay by outputting the bit associated with the survivor path at time i for the state $x[i] \in \{0,1\}$ with the largest metric $\Lambda_x[i]$. Specifically, at time i, the flowchart traces back some K of stages in the trellis and outputs the bit b[i−K] corresponding to the path for state $x[i] \in \{0,1\}$ with the largest metric $\Lambda_x[i]$ at time i. Typically, $1 \leq K \leq L$.

In the example of FIG. 4B, the modules 452-462 are quite similar to modules 402-412, so they are not re-described here. In the example of FIG. 4B, the flowchart 400B continues from the module 462 to the decision point 464 where it is determined whether a metric 0 greater than a metric 1. If it is determined that the metric 0 is greater than the metric 1, then the flowchart 400B continues to module 466 where the bit $\tilde{b}[i-K]$ for the survivor path associated with State 0 at time i is output. If, on the other hand, it is determined that the metric 0 is less than the metric 1, then the flowchart 400B continues to module 468 where the bit $\tilde{b}[i-K]$ for the survivor path associated with State 1 at time i is output.

In the example of FIG. 4B, the flowchart 400B continues to decision point 470 where it is determined whether i=L−1. If it is determined that i≠L−1 (470-N), then the flowchart 400B returns (recursively) to module 454 and continues as described previously. Thus, the process is repeated over each bit time. When it is determined that i=L−1 (470-Y), the recursion ends.

Figure 5:
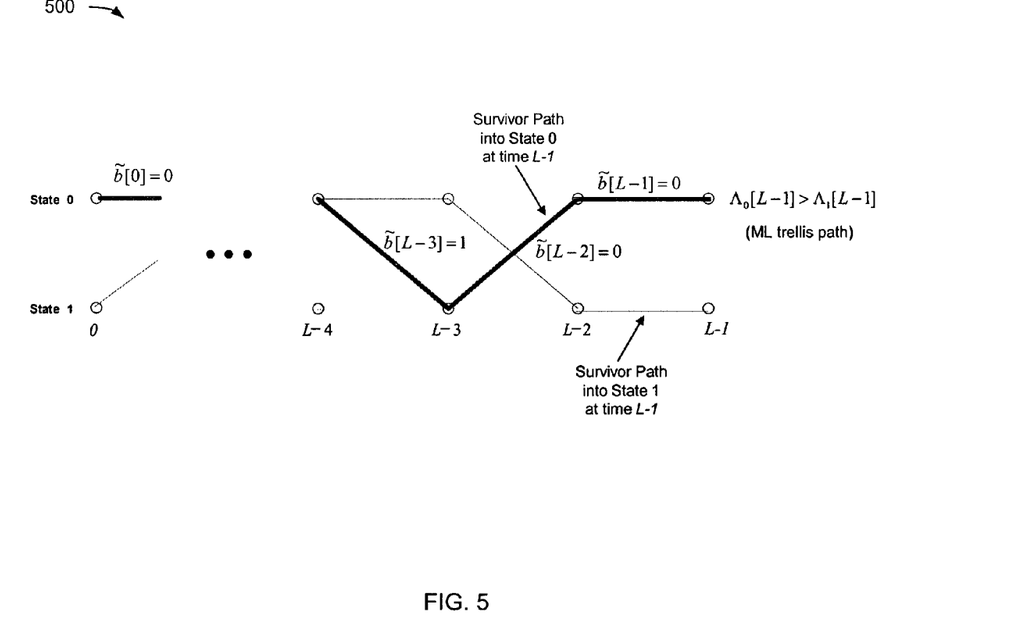
FIG. 5 depicts a diagram of an example of mapping an ML path to bit estimates.

In the example of FIG. 4B, the flowchart 400B continues to module 472 where any remaining bits along the survivor path with the maximum metric are demodulated. For example, if you go back K stages, then you output K bits. In an illustrative embodiment, the bits b[L−K] to b[L−1] are output. After module 472, the flowchart 400B ends. FIG. 5 depicts a diagram 500 of an example of mapping an ML path to bit estimates.

In an alternate technique, you could trace back some random number K of stages in the trellis until the 2 bit values corresponding to both surviving paths in the trellis at time i are the same. This results in a random delay in the bit outputs.

Figure 6:
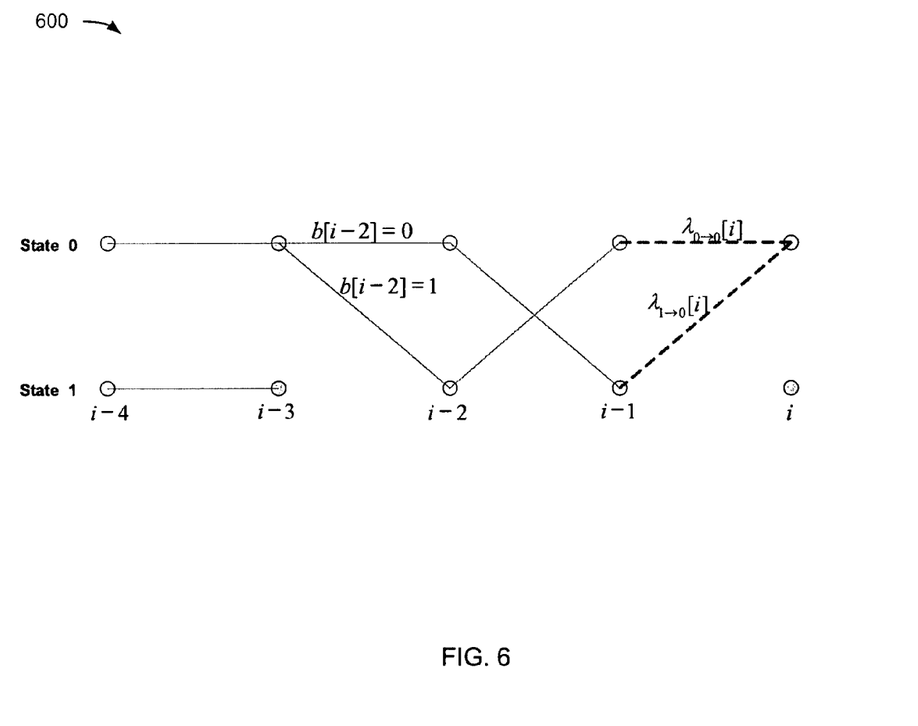
FIG. 6 depicts a diagram of an example of a trellis and survivor path computation between the i−1th and ith stage.

FIG. 6 depicts a diagram 600 of an example of a trellis and survivor path computation between the i−1th and ith stage. In the example of FIG. 6, solid branches correspond to surviving paths (note there is only one entering each state at any trellis stage) and dashed branches corresponds to not yet decided survivor path entering State 0 at trellis stage i. If $\Lambda_1[i-1] + \lambda_{1 \to 0}[i] > \Lambda_0[i-1] + \lambda_{0 \to 0}[i]$, the surviving branch entering State 0 in trellis section i starts in State 1 and ends in State 0. With the selection of this lower dashed branch as the surviving branch of the ML path, the parameters for the ML metric associated with the ith trellis stage are updated according to $\mu_0[i]=1, d_0[i]=R_p[d_1[i-1]+0], \Lambda_0[i]=\Lambda_1[i-1]+\lambda_{1 \to 0}[i]$. These parameters only depend on their previous values, i.e., a buffer of size two for each parameter is enough.

As stated earlier, the phase is slightly different over the first and last bit times since the phase over the first bit time does not have memory associated with the previous bit, and the phase over the last bit time does not have memory associated with a subsequent bit. We denote the phases corresponding to these first and last bit periods as $\omega_s(\tau, b[0])$ and $\omega_e(\tau, b[L-1])$, respectively. We similar define $$z_s(b[0]) = \int_0^T e^{j2\pi h\omega(\tau,b[0])}\,d\tau$$

and $$z_e(b[L-1]) = \int_0^T e^{j2\pi h\omega(\tau,b[L-1])}\,d\tau$$

so that we can express the metrics for the first trellis stage as $$\Lambda_0[0] = \mathrm{Re}\{r[0]z_s^*(0)e^{-j\hat{\phi}_0[0]}\},$$

$$\Lambda_1[0] = \mathrm{Re}\{r[0]z_s^*(1)e^{-j\hat{\phi}_0[0]}\},$$

where $e^{-j\phi_0[i]}$ is the initial phase estimate. In an implementation, the preamble processing will often take care of the first bit transmission and also provide an estimate of the phase offset $\phi_0$. In this case $z_s(0)$ and $z_s(1)$ will never be used.

After updating $\Lambda_y[L-1]$ for $y\in\{0,1\}$ according to above, the tail of the signal need to be added using $z_e(y)$ as $$\Lambda_0[L-1] = \Lambda_0[L-1] + \mathrm{Re}\{r[L]z_e^*(0)e^{-j(\hat{\phi}_0[L-1]+2\pi\hat{\Delta}_f[L-1](L-1)T)}\},$$

$$\Lambda_1[L-1] = \Lambda_1[L-1] + \mathrm{Re}\{r[L]z_e^*(1)e^{-j(\hat{\phi}_0[L-1]+2\pi\hat{\Delta}_f[L-1](L-1)T)}\}.$$

The decisions on the last information bit is $\tilde{b}[L-1]=x$ if $\Lambda_x[L-1]>\Lambda_y[L-1]$ and the remaining bit decisions are made according to $\tilde{b}[i]=\mu_{\tilde{b}[i+1]}[i+1]$ for $i=0,1,2,\ldots,L-2$.

There are several techniques that can be used to obtain the time-varying phase estimate $\hat{\phi}(t)=\hat{\phi}_0+2\pi\hat{\Delta}_f t$, including estimation algorithms applied to training sequences or preambles in the data prior to demodulation, data-driven estimation that is updated at each symbol time, or other techniques. Since the branch metric calculation described above can be updated based on the previous values of $\Lambda_y[i]$, $d_y[i]$, $\mu_y[i]$, a low-complexity algorithm would have the property that the phase estimation algorithm can be updated based only on the values from the previous stage of the branch metric calculation, i.e. if $\hat{\phi}_0[i]$ denotes the phase offset estimate at time i, it is desirable from a low-complexity perspective that this estimate depend only on $\hat{\phi}_0[i-1]$, and similarly the frequency offset estimate at time i, $\hat{\Delta}_f[i]$ should depend only on $\hat{\Delta}_f[i-1]$.

Figure 7A:
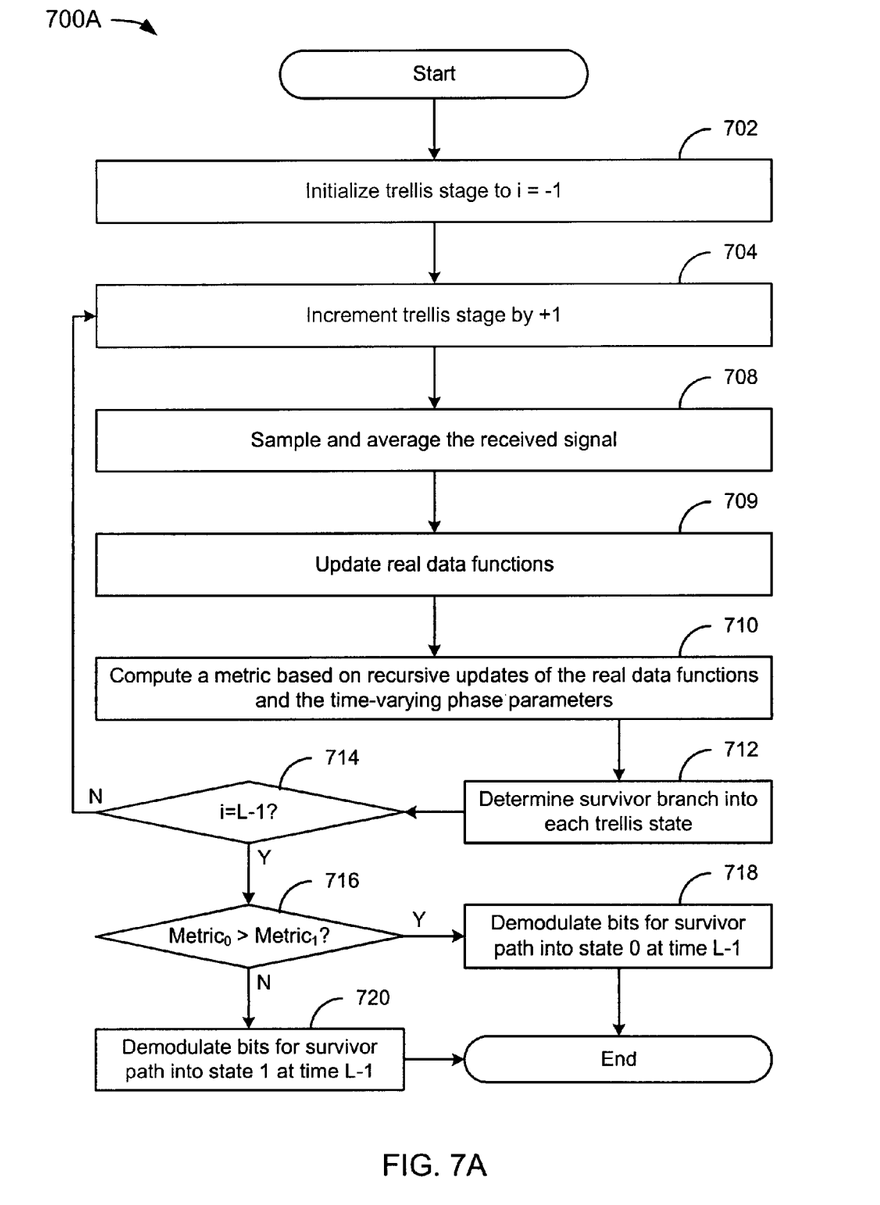
FIGS. 7A and 7B depict flowcharts of examples of methods for reducing ML detector complexity through per-survivor processing.
Figure 7B:
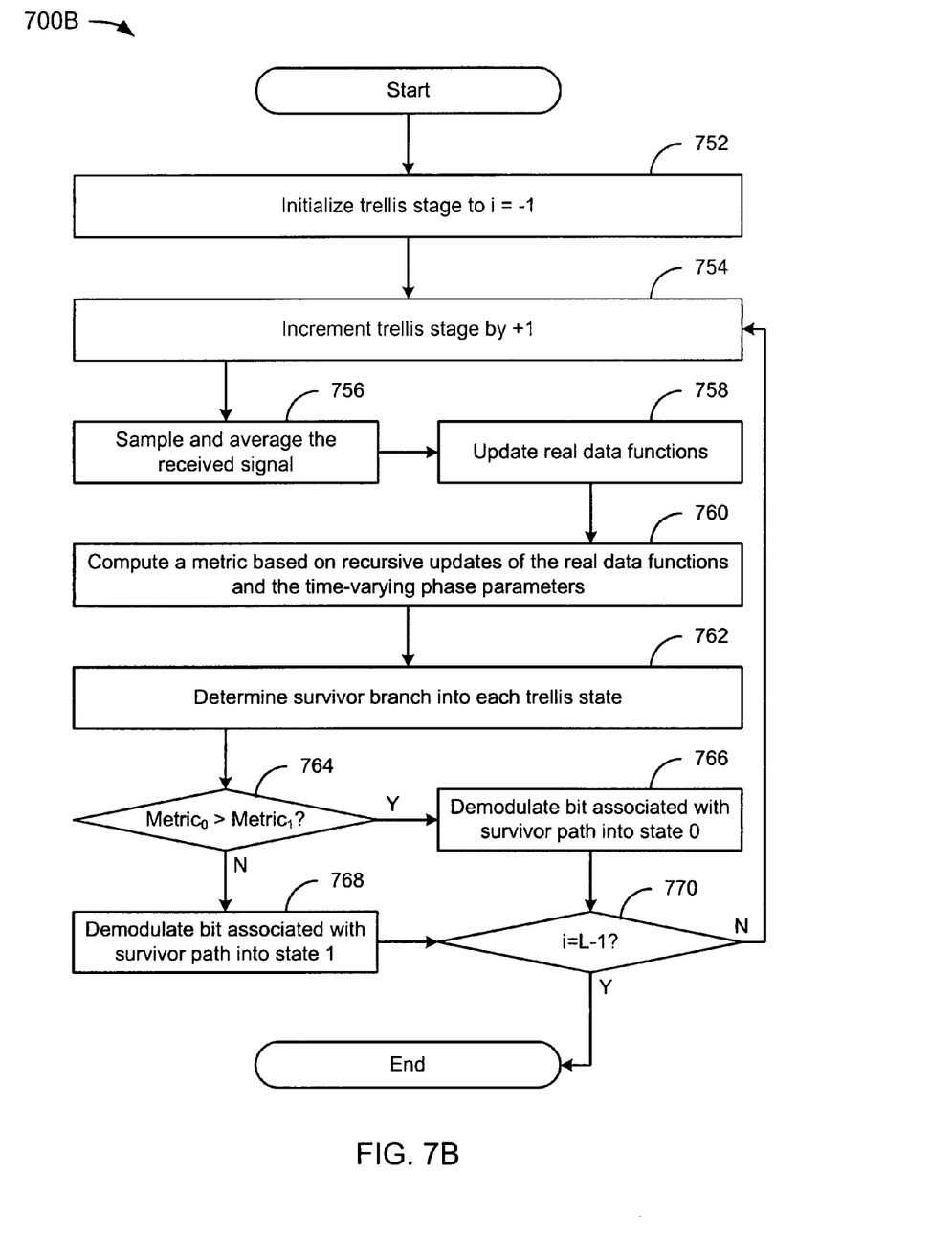

FIGS. 7A and 7B depict flowcharts 700A and 700B of examples of methods for reducing ML detector complexity through per-survivor processing. The flowcharts 700A and 700B are similar to the flowcharts 400A and 400B (FIGS. 4A and 4B), though different exemplary computations may be in order at certain of the steps. Notably, FIGS. 7A and 7B respectively refer to real data functions at modules 709, 710 and 758, 760. Advantageously, the use of real data functions, instead of complex data functions, can significantly reduce the complexity of the computations.

In an illustrative embodiment, a transmitted phase can be expressed as a function of the accumulated bits and the last two bits as $\phi(\tau+(n-1)T,a)=\pi h d[n-2]+2\pi h\omega(\tau,a[n-1],a[n])$, where $d[n-2]$ and $\omega(\tau,a[n-1],a[n])$ are redefined as $$d[n-2] = \sum_{i=0}^{n-2} a[i]\omega(\tau,a[n-1],a[n]) = a[n-1]q(\tau+T) + a[n]q(\tau).$$

where again $a[i]\in\{+1,-1\}$ is the polar representation of the binary data. Then $\rho[m_i]=e^{j\pi h d[i-2]}z(a[i-1],a[i])$).

Let us denote the phase estimate at time i by q[i]. We can obtain this estimate based on averaging over the current and last sample as $e^{j\phi}=q[i]=\alpha q[i-1]+(1-\alpha)r[i]\rho^*[\tilde{m}_i]$, where $0\leq\alpha\leq 1$ is the forgetting factor for the previous sample. Similarly, let us denote the frequency offset estimate at time i by $$e^{j2\pi\hat{\Delta}_f} = \frac{p[i]}{|p[i]|},$$

where $p[i]=\beta p[i-1]+(1-\beta)r[i]\rho^*[\tilde{m}_i]\rho[\tilde{m}_{i-1}]r^*[i-1]$, and $0\leq\beta\leq 1$ is the forgetting factor. The branch metric for trellis section i in (6) can now be approximated by $\lambda[i]=\mathrm{Re}\{r[i]\rho^*[\tilde{m}_i]q^*[i-1]\}$, where q[i] is the combined phase and frequency offset estimate according to $$q[i] = (\alpha q[i-1] + (1-\alpha)r[i]\rho^*[\tilde{m}_i])\frac{p[i-1]}{|p[i-1]|}.$$

Define also $\delta_y[i]=hd_y[i-1]$ and $u[i]=r[i]\rho^*[\tilde{m}_i]=r[i]e^{-j\pi\delta[i-1]}z^*(a[i-1],a[i])$. These calculations require multiplications of complex numbers, which can be simplified to additions of real numbers as follows. Let $\bar{z}\in[-1,+1)$ denote the angle of the complex number z divided by $\pi$, such that $z=e^{j\pi\bar{z}}$. Further, define $\bar{r},\bar{u},\bar{q},\bar{p}$, such that $r=e^{j\pi\bar{r}},u=e^{j\pi\bar{u}},q=e^{j\pi\bar{q}},p=e^{j\pi\bar{p}}$. This means that $\bar{u}[i]=\bar{r}[i]-\delta[i-1]-\bar{z}(a[i-1],a[i])$, $\lambda[i]=\cos(\pi(\bar{u}[i]-\bar{q}[i-1]))$.

However, some further modifications are needed for the updates of the phase and frequency offset estimation q[i]. Consider two complex-valued numbers with unit amplitude, $e^{-j\pi a}$ and $e^{-j\pi b}$ for $-1\leq a\leq +1$ and $-1\leq b\leq +1$. The weighted sum of these numbers can then be approximated according to $\gamma e^{j\pi a}+(1-\gamma)e^{j\pi b}\approx e^{j\pi(a+(1-\gamma)[b-a]_{-1}^{+1})}$, where parameter $0\leq\gamma\leq 1$ acts as a weighting factor and $[b-a]_{-1}^{+1}=\mathrm{mod}(b-a-1,2)-1$, which means that the number inside the brackets is wrapped around within $[-1,+1)$. This is easily implemented in fixed point arithmetic by using one bit for the integer part and the rest of the bits for the fractional part together with wrapping instead of saturation, e.g., $[0.5+0.7]_{-1}^{+1}=-0.8$. This also means that the modulo p operator $R_p[c]$ is no longer needed. According to this approximation the recursive updates for the phase and frequency offset estimation can be simplified to $$\bar{q}[i]=[\bar{q}[i-1]+(1-\alpha)[\bar{u}[i]-\bar{q}[i-1]]_{-1}^{+1}+\bar{p}[i-1]]_{-1}^{+1},$$

$\bar{p}[i]=[\bar{p}[i-1]+(1-\beta)[\bar{u}[i]-\bar{u}[i-1]-\bar{p}[i-1]]_{-1}^{+1}]_{-1}^{+1}$. Note also that the normalization of p is no longer necessary, since the operations are performed in phase domain.

The updates of $\Lambda[i]$, $\delta[i]$, $\mu[i]$, $\bar{u}[i]$, $\bar{q}[i]$, $\bar{p}[i]$ through the trellis and the decisions on the bits $\tilde{b}[i]$ can be explained by the following pseudo code:

```
for i = 1 : L (for all trellis sections)
    for y = 0 : 1 (for all ending states)
        for x = 0 : 1 (for all starting states)
            ū'ₓ = [r̄[i] − δₓ[i − 1] − z̄(x,y)]₋₁⁺¹
            Λ'ₓ = Λₓ[i − 1] + cos(π(ū'ₓ − q̄ₓ[i − 1]))
        end
        if Λ'₁ > Λ'₀ (finding the winning starting state)
            μᵧ[i] = 1
            δᵧ[i] = [δ₁[i − 1] + h]₋₁⁺¹
            Λᵧ[i] = Λ'₁
```

-continued

```
    ū_y[i] = ū'_1
    q̄_y[i] = [q̄_1[i - 1] + (1 - α)[ū_y[i] - q̄_1[i - 1]]_{-1}^{+1} + p̄_1[i - 1]]_{-1}^{+1}
    p̄_y[i] = [p̄_1[i - 1] + (1 - β)[ū_y[i] - ū_1[i - 1] - p̄_1[i - 1]]_{-1}^{+1}]_{-1}^{+1}
  else
    μ_y[i] = 0
    δ_y[i] = [δ_0[i - 1] - h]_{-1}^{+1}
    Λ_y[i] = Λ'_0
    ū_y[i] = ū'_0
    q̄_y[i] = [q̄_0[i - 1] + (1 - α)[ū_y[i] - q̄_0[i - 1]]_{-1}^{+1} + p̄_0[i - 1]]_{-1}^{+1}
    p̄_y[i] = [p̄_0[i - 1] + (1 - β)[ū_y[i] - ū_0[i - 1] - p̄_0[i - 1]]_{-1}^{+1}]_{-1}^{+1}
  end
end
if Λ_1[i] > Λ_0[i] (trace back decision by K=1 and normalization of metric)
  Λ_0[i] = Λ_0[i] - Λ_1[i]
  Λ_1[i] = Λ_1[i] - Λ_1[i] = 0
  b̂[i - 1] = μ_1[i]
else
  Λ_1[i] = Λ_1[i] - Λ_0[i]
  Λ_0[i] = Λ_0[i] - Λ_0[i] = 0
  b̂[i - 1] = μ_0[i]
end
end
```

Note that the above parameters only depend on their previous values, i.e., a buffer of size two for each parameter is enough. Only $\mu_y[i]$ needs to be saved for all $y \in \{0,1\}$ and $i=1, 2, \ldots, L-1$ to be able to track the surviving path through the entire trellis, but on the other hand, $\mu_y[i]$ only contains 1 bit. The normalization of the metric $\Lambda_y[i]$ is just to keep it from overflowing. The length of the trace back K to make decisions on the data bits can also be made longer than one symbol which may lead to some performance benefit.

In DPSK (also referred to as D-MPSK) the transmitted complex symbols are given by $s[i]=s[i-1]e^{j\pi\phi[i]}$ where $\phi[i] \in S$ is the data phase carrying the $m=\log_2(M)$ information bits $$S \in \left\{\frac{2k}{M}\right\}, k = 0, 1, \ldots, M - 1.$$

In an illustrative embodiment, the information bits are mapped to the phases using Gray mapping. The first symbol $s[0]=e^{j\pi\phi[0]}$ is transmitted with an arbitrary phase $\phi[0] \in [-1,+1)$. The transmitted symbols can also be written as $s[i]= e^{j\pi(\Phi[i]+\phi[0])}=e^{j\pi\Phi[i]}e^{j\pi\phi[0]}$, where $\Phi[i] \in S$ denotes the coherent data phases with $$\Phi[i] = \sum_{n=1}^{i} \phi[n] \text{ and } \Phi[0] = 0.$$

Note that $\phi[i]=\Phi[i]-\Phi[i-1]$, for $i=1, 2, \ldots, L$. The transmitted baseband analog signal is given by $$s(t) = \sum_{i=1}^{L} s[i]h(t - iT) = e^{j\pi\phi[0]} \sum_{i=1}^{L} e^{j\pi\Phi[i]}h(t - iT),$$

where $h(t)$ is the transmit pulse shaping and T is the data symbol duration. The received base band signal is $$r(t) = \sum_{i=0}^{L} s[i]h(t - \tau - iT)e^{j\pi(2\Delta t - 2\Delta\tau)} + n(t)$$

$$= \sum_{i=0}^{L} e^{j\pi\Phi[i]}h(t - \tau - iT)e^{j\pi(2\Delta t + \theta)} + n(t),$$

where $\tau$ is the unknown propagation delay, $\Delta$ is the unknown frequency offset, $\theta=\phi[0]-2\Delta\tau$ is the unknown phase offset, and $n(t)$ is the additive white Gaussian noise with two sided power spectral density $$\frac{N_0}{2}.$$

DPSK modulation can be modeled by a trellis with M states $y=0, 1, \ldots, M-1$, where the reference symbol going into state y is $$z = e^{j\pi\frac{2y}{M}}.$$

There may or may not be unknown parameters associated with, for example, the signal. The DPSK signal can be demodulated by finding the maximum likelihood path through the trellis associated with the received signal, as has been described previously for GFSK (e.g., with reference FIG. 1).

In an illustrative embodiment, the transmit pulse can be truncated by using a window $w(t)$ that is non-zero except N symbol intervals centered around zero $$\tilde{h}(t) = \begin{cases} h(t)w(t) & -NT/2 \leq t \leq NT/2 \\ 0 & \text{elsewhere} \end{cases}.$$

Using $\tilde{h}(t)$ as the transmit pulse, the received signal becomes $$r(t) = \sum_{i=0}^{L-1} e^{j\pi\Phi[i]}\tilde{h}(t - \tau - iT)e^{j\pi(2\Delta t + \theta)} + n(t).$$

This signal is averaged over the ith bit period to obtain $$r[i] = \frac{1}{N}\sum_{k=0}^{N-1} r((i + k/N)T).$$

Assuming perfect timing, the demodulation can be performed by a trellis search on a fully connected trellis with M states for the symbol $z[i]$ that maximizes the maximum likelihood metric $\Lambda[L-1]$ for $L-1$ symbols given by $$\Lambda[L - 1] = \text{Re}\left\{\sum_{i=0}^{L-1} r[i]z^*[i]q^*[i]\right\}.$$

Using the same notation as for GFSK, described previously, define $\bar{z}, \bar{r}, \bar{u}, \bar{q}, \bar{p}$, such that $z=e^{j\pi\bar{z}}, r=e^{j\pi\bar{r}}, u=e^{j\pi\bar{u}}, q=e^{j\pi\bar{q}}, p=e^{j\pi\bar{p}}$ which means that $\bar{z}(y)=[2y/M]_{-1}^{+1}$.

The updates of $\Lambda[i], \mu[i], \bar{u}[i], \bar{q}[i], \bar{p}[i]$ through the trellis and the decisions on the phases $\hat{\phi}[i]$ can be explained by the following pseudo code.

```
for i = 1:L (for all trellis sections)
    for y = 0:M − 1 (for all ending states)
        for x = 0:M − 1 (for all starting states)
```
$$\bar{u}'_x = [\bar{r}[i] - \bar{z}(y)]^{+1}_{-1}$$

$$\Lambda'_x = \Lambda_x[i-1] + \cos(\pi(\bar{u}'_x - \bar{q}_x[i-1]))$$

```
        end
```
$x^* = \underset{x}{\operatorname{argmax}} \Lambda'_x$ (winning starting state)

$\mu_y[i] = x^*$ $\Lambda_y[i] = \Lambda'_{x^*}$ $\bar{u}_y[i] = \bar{u}'_{x^*}$ $\bar{q}_y[i] = [\bar{q}_{x^*}[i-1] + (1-\alpha)[\bar{u}_y[i] - \bar{q}_{x^*}[i-1]]^{+1}_{-1} + \bar{p}_{x^*}[i-1]]^{+1}_{-1}$ $\bar{p}_y[i] = [\bar{p}_{x^*}[i-1] + (1-\beta)[\bar{u}_y[i] - \bar{u}_{x^*}[i-1] - \bar{p}_{x^*}[i-1]]^{+1}_{-1}]^{+1}_{-1}$

```
    end
```
$y^* = \underset{y}{\operatorname{argmax}} \Lambda_y[i]$ (winning ending state)

```
    for y = 0:M − 1 (normalize the metric to prevent overflow)
```
$\Lambda_y[i] = \Lambda_y[i] - \Lambda_{y^*}[i]$

```
    end
    for k = i : −1 : i − K (trace back in the trellis)
```
$l = \operatorname{mod}(y^* - \mu_{y^*}[k], M)$ $y^* = \mu_{y^*}[k]$

```
    end
```
$\hat{\phi}[i-K] = \bar{z}[l]$

```
end
```

$K \leq 0$ is the trace back length that will also affect the delay of the decision. To even further reduce the complexity the starting state x can be put to the winning ending state from the previous trellis section, i.e., $$x = \underset{y}{\operatorname{argmax}} \Lambda_y[i-1].$$

That will reduce the innermost for-loop with a factor of M.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method comprising:
   demodulating a received signal in a signal receiver by determining estimates of unknown parameters of the received signal by using a weighted addition of real numbers and without performing an operation on a complex number;
   selecting a maximum likelihood path through a trellis based on the estimates; and
   mapping the maximum likelihood path to an output bit sequence.

2. A method comprising:
   in a signal receiver, demodulating a received signal by sampling the signal over a bit period;
   updating time-variable phase parameters by using a weighted addition of real numbers and without using multiplication of a complex number;
   computing a branch metric function associated with bits of the received signal received up to a current time;
   finding a trellis state that maximizes a branch metric of the trellis, wherein the branch metric is based on said branch metric function; and
   determining an estimate for the transmitted data based on the trellis state that maximizes the branch metric.

3. The method of claim 2, further comprising initializing a trellis stage.

4. The method of claim 2, further comprising, recursively, incrementing a trellis stage;
   sampling and averaging the received signal;
   updating data functions; and
   computing a metric based on recursive updates of the data functions and the time-variable phase parameters.

5. The method of claim 4, wherein the data functions include real data functions and not complex data functions.

6. The method of claim 4, further comprising, recursively estimating time-varying phase parameters.

7. The method of claim 4, further comprising, recursively estimating phase offsets and frequency offsets.

8. The method of claim 4, further comprising:
   determining, recursively, a survivor branch into each trellis state;
   determining whether the branch metric is greater for a first state or a second state;
   demodulating bits for a survivor path into the first state if the branch metric is greater for the first state than for the second state;
   demodulating bits for a survivor path into the second state if the branch metric is not greater for the first state than for the second state.

9. The method of claim 4, further comprising, recursively:
   determining a survivor branch into each trellis state;
   determining whether the branch metric is greater for a first state or a second state;
   demodulating a bit associated with a survivor path into the first state if the branch metric is greater for the first state than for the second state;
   demodulating a bit associated with a survivor path into the second state if the branch metric is not greater for the first state than for the second state.

10. The method of claim 9, further comprising demodulating any remaining bits along the survivor path into the first state.

11. The method of claim 1, wherein the unknown parameters comprise a parameter that is a function of a phase of the received signal or a parameter that is a function of a frequency of the received signal.

12. The method of claim 11, wherein the received signal is a GFSK signal or a DPSK signal.

13. The method of claim 1, wherein the unknown parameters comprise a phase offset and a frequency offset.

14. A method comprising:
in a signal receiver, determining an estimate of an unknown parameter of a received signal by using a weighted addition of real numbers and without performing an operation on a complex number; and
demodulating the received signal based on the estimate.

15. The method of claim 14, wherein the unknown parameter comprises a parameter that is a function of a phase of the received signal or a parameter that is a function of a frequency of the received signal.

16. The method of claim 15, wherein the received signal is a GFSK signal or a DPSK signal.

17. The method of claim 14, wherein the unknown parameter comprises a phase offset or a frequency offset.

18. The method of claim 9, further comprising demodulating any remaining bits along the survivor path into the second state.

* * * * *